US012597541B2

(12) United States Patent
Hosono et al.

(10) Patent No.: US 12,597,541 B2
(45) Date of Patent: Apr. 7, 2026

(54) ALLOY FOR R-T-B BASED PERMANENT MAGNET AND METHOD FOR MANUFACTURING R-T-B BASED PERMANENT MAGNET

(71) Applicant: TDK CORPORATION, Tokyo (JP)

(72) Inventors: Uremu Hosono, Tokyo (JP); Yudai Sugano, Tokyo (JP); Hikaru Kudo, Tokyo (JP)

(73) Assignee: TDK CORPORATION, Tokyo (JP)

( * ) Notice: Subject to any disclaimer, the term of this patent is extended or adjusted under 35 U.S.C. 154(b) by 999 days.

(21) Appl. No.: 17/704,230

(22) Filed: Mar. 25, 2022

(65) Prior Publication Data

US 2022/0328221 A1 Oct. 13, 2022

(30) Foreign Application Priority Data

Mar. 30, 2021 (JP) ................................ 2021-058801

(51) Int. Cl.
*H01F 1/057* (2006.01)
*C22C 38/00* (2006.01)
*H01F 1/00* (2006.01)
*H01F 41/02* (2006.01)

(52) U.S. Cl.
CPC ......... *H01F 1/0577* (2013.01); *C22C 38/005* (2013.01); *H01F 41/0293* (2013.01); *C22C 2202/02* (2013.01); *H01F 1/00* (2013.01)

(58) Field of Classification Search
CPC ... C22C 38/00; C22C 38/005; C22C 2202/02; H01F 1/032; H01F 1/04; H01F 1/047; H01F 7/04; H01F 41/0253; H01F 41/0266; H01F 41/0293
See application file for complete search history.

(56) References Cited

U.S. PATENT DOCUMENTS

2002/0129874 A1* 9/2002 Kaneko ................. C22C 1/0441 148/121
2013/0142687 A1* 6/2013 Onimura ................. C22C 33/02 75/331
2016/0027563 A1 1/2016 Shimizu
2019/0189316 A1 6/2019 Shimizu
2019/0329319 A1* 10/2019 Zhu ......................... C22C 38/00

FOREIGN PATENT DOCUMENTS

JP H07176414 A * 7/1995 ........... H01F 1/0577
JP 2000-219942 A 8/2000
JP 2003-188006 A 7/2003
JP 2004-181531 A 7/2004
JP 2006265609 A * 10/2006
WO 2014/156181 A1 10/2014
WO WO-2018121112 A1 * 7/2018 ........... B22D 11/001

OTHER PUBLICATIONS

Computer-generated translation of JP 2000-219942 (A) to Hashimoto Takahiro et al. (Applicant: Shinetsu Chemical Co), originally published on Aug. 8, 2000. (Year: 2000).*

* cited by examiner

*Primary Examiner* — Vanessa T. Luk
(74) *Attorney, Agent, or Firm* — Oliff PLC

(57) ABSTRACT

To provide an alloy for an R-T-B based permanent magnet from which an R-T-B based permanent magnet having improved magnetic properties can be manufactured. The alloy for an R-T-B based permanent magnet contains R, T, and B, in which R is a rare earth element, T is a transition metal element, and B is boron. An area ratio of a non-columnar crystal structure in a cross section is 1.0% or more and 30.0% or less.

5 Claims, 12 Drawing Sheets

4

ALLOY FOR R-T-B BASED PERMANENT MAGNET AND METHOD FOR MANUFACTURING R-T-B BASED PERMANENT MAGNET

BACKGROUND OF THE INVENTION

The present disclosure relates to an alloy for an R-T-B based permanent magnet and a method for manufacturing an R-T-B based permanent magnet.

Patent Document 1 describes an invention related to an alloy flake for a rare earth magnet in which a thickness and a surface roughness are within a specific range. By setting a surface roughness of a surface of a rotary roll for casting within the specific range, a fine R-rich phase region in the alloy flake for the rare earth magnet is decreased and magnetic properties of the alloy flake for the rare earth magnet is improved.

Patent Document 2 describes an invention related to a method for manufacturing a rare earth-containing alloy flake in which a shape of a casting surface of a rotary roll for casting is a specific shape, and a surface roughness of the casting surface of the rotary roll for casting is within a specific range. An R-T-B based alloy flake manufactured by the manufacturing method has a reduced fine R-rich phase region and is excellent in homogeneity.

Patent Document 3 describes an invention related to a raw material alloy for an R-T-B based magnet in which a volume fraction ratio of a region where secondary dendrite arms have generated is within a specific range. Since a structure is miniaturized by the generation of the secondary dendrite arms, a coercivity of an R-T-B based sintered magnet obtained using the raw material alloy for an R-T-B based magnet as a raw material is improved.

Patent Document 1: JP 2003-188006 (A)
Patent Document 2: JP 2004-181531 (A)
Patent Document 3: WO 2014/156181 (A1)

SUMMARY OF THE INVENTION

An object of the present disclosure is to provide an alloy for an R-T-B based permanent magnet from which an R-T-B based permanent magnet having improved magnetic properties can be manufactured.

In order to achieve the above object, an alloy for an R-T-B based permanent magnet according to present disclosure contains R, T, and B, wherein R is at least one of rare earth elements, T is at least one of transition metal elements, and B is boron, and an area ratio of a non-columnar crystal structure in a cross section of the alloy is 1.0% or more and 30.0% or less.

The area ratio of the non-columnar crystal structure may be 4.0% or more and 30.0% or less.

The non-columnar crystal structure may contain a chill crystal structure, and an area ratio of a structure other than the chill crystal structure in the non-columnar crystal structure may be 50% or more.

R content may be 29.0 mass % or more and 33.5 mass % or less, and B content may be 0.70 mass % or more and less than 0.96 mass %.

A method for manufacturing an R-T-B based permanent magnet according to the present disclosure includes a step of pulverizing the alloy for an R-T-B based permanent magnet.

DETAILED DESCRIPTION OF THE PREFERRED EMBODIMENTS

Figure 1:
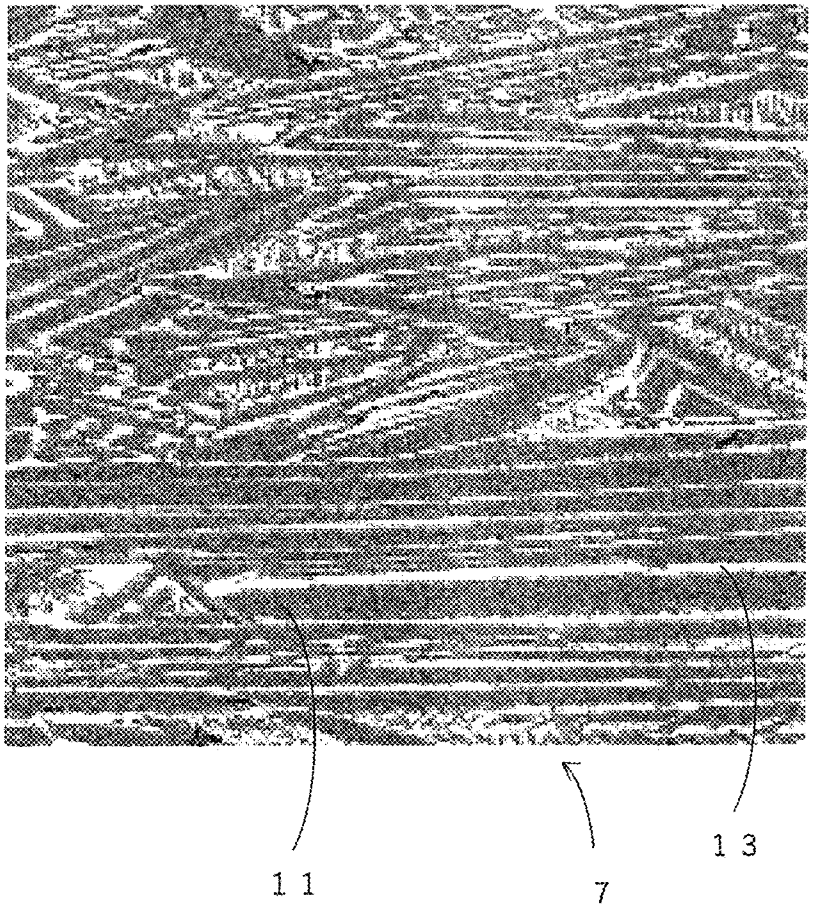
FIG. 1 is a backscattered electron image of a normal structure.

Hereinafter, the present disclosure will be described based on embodiments shown in the drawings.

<Structure of Alloy for R-T-B based Permanent Magnet>

An alloy for an R-T-B based permanent magnet according to the present embodiment contains R, T, and B, R is at least one of rare earth elements, T is at least one of transition metal elements, B is boron, and an area ratio of a non-columnar crystal structure in a cross section is 1.0% or more and 30.0% or less.

In general, the alloy for an R-T-B based permanent magnet includes a main phase which is a columnar crystal having an $R_2T_{14}B$ type crystal structure, and an R-rich phase in which R content is larger than that of the main phase.

In the cross section of the alloy for an R-T-B based permanent magnet, as shown in a backscattered electron image of FIG. 1, a clear difference between a main phase 11 and an R-rich phase 13 can be confirmed, and a structure 7 (hereinafter, referred to as a normal structure 7) in which most of the R-rich phases 13 are linear in shape occupies the majority. Most of the main phases 11 contained in the normal structure 7 are columnar crystals. In the normal structure 7, an interval between the R-rich phases being linear in shape (hereinafter, referred to as a linear R-rich phase) is 2 μm or more on average. In addition, the normal structure 7 is a structure in which a primary dendrite extends in a direction of solidification of the alloy, in other words, mainly in a thickness direction of the alloy.

In addition to the normal structure 7, the alloy for an R-T-B based permanent magnet contains a structure containing a main phase that is not a columnar crystal. The main phase that is not the columnar crystal is called a non-columnar crystal, and a structure containing the non-columnar crystal is called a non-columnar crystal structure. In addition, the non-columnar crystal structure is a structure in which the primary dendrite does not necessarily extend in the direction of solidification of the alloy.

The non-columnar crystal structure contained in the alloy for an R-T-B based permanent magnet is classified into six types when a structure 1*a* and a structure 1*b*, which will be described later, are distinguished from each other. Hereinafter, the six types of non-columnar crystal structures will be described with reference to the drawings (backscattered electron image).

Figure 2:
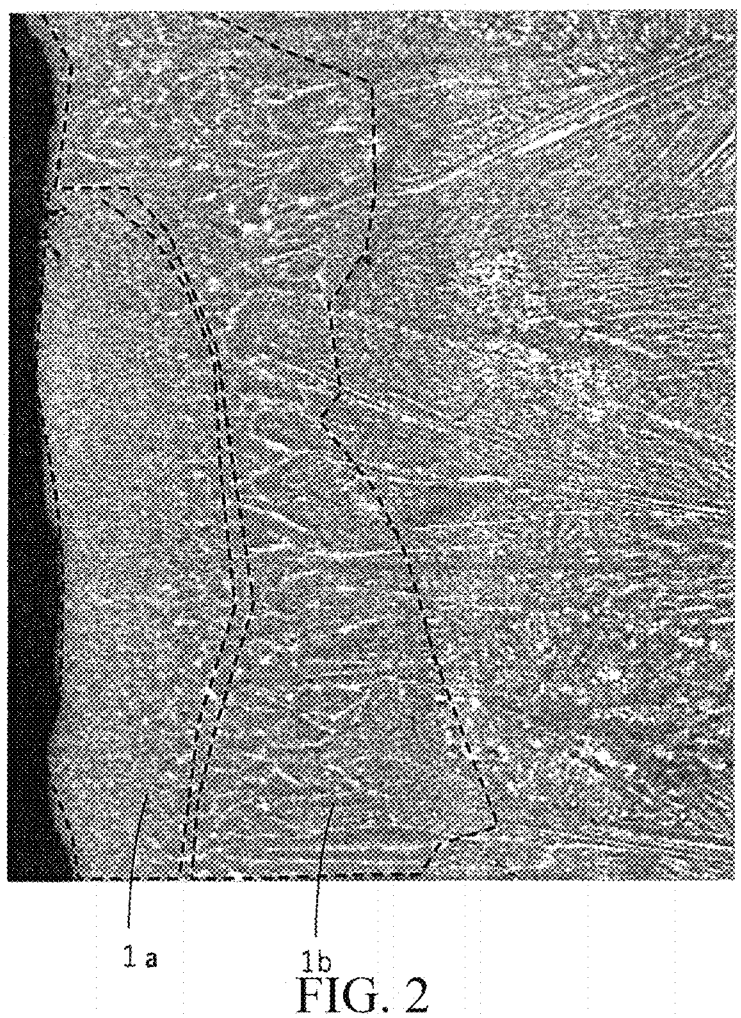
FIG. 2 is a backscattered electron image of a chill crystal structure.

FIG. 2 includes a chill crystal structure, and the chill crystal structure includes the structures 1_a_ and 1_b_. The structure 1_a_ has a larger difference from the normal structure 7 than the structure 1_b_. In the structure 1_a_, no clear difference is found between the main phase and the R-rich phase. In the structure 1_a_, a luminance in the backscattered electron image is about between the main phase and the R-rich phase. Further, in the structure 1_a_, a variation of light and shade in the backscattered electron image is smooth.

The structure 1_b_ is a structure closer to the normal structure 7 than the structure 1_a_. However, in the structure 1_b_, no clear difference is found between the main phase and the R-rich phase. In the structure 1_b_, a luminance in the backscattered electron image is about between the main phase and the R-rich phase. Further, in the structure 1_b_, a variation of light and shade in the backscattered electron image is smooth. In addition, unlike the structure 1_a_, the structure 1_b_ contains some linear R-rich phases.

In the following description, the structure 1_a_ and the structure 1_b_ are not distinguished when they are simply described as chill crystal structures.

Figure 3:
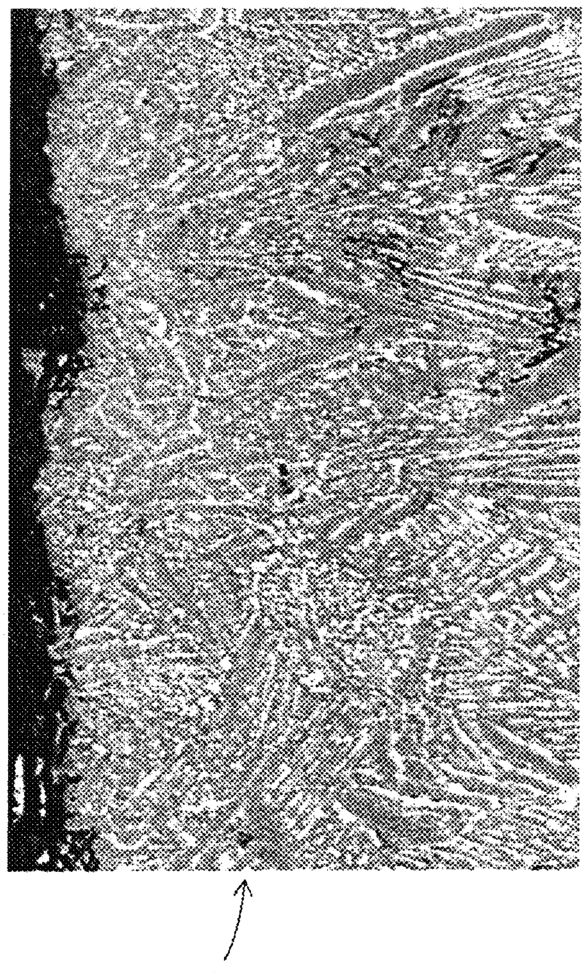
FIG. 3 is a backscattered electron image of a fine dot-like R-rich phase-containing structure.
Figure 4:
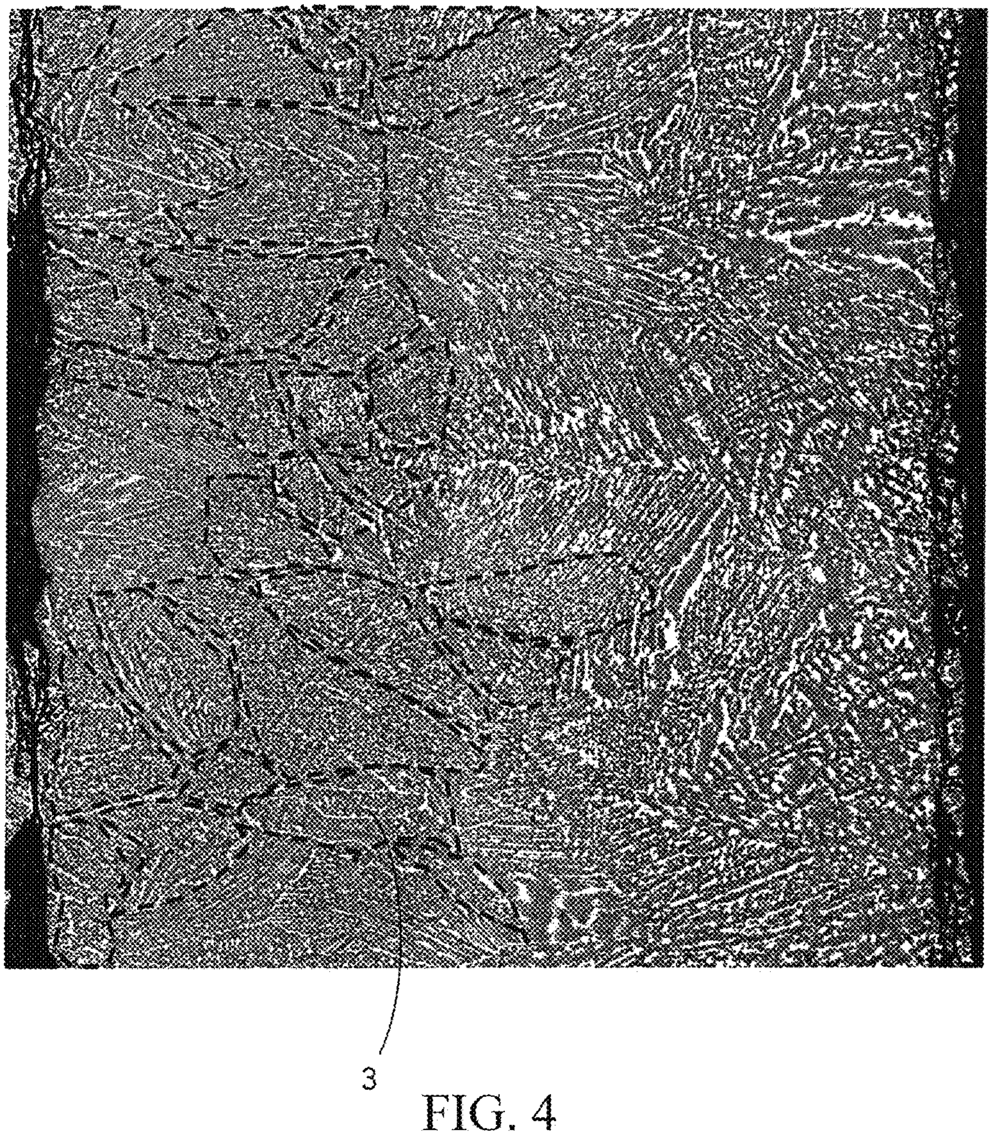
FIG. 4 is a backscattered electron image of the fine dot-like R-rich phase-containing structure.

FIGS. 3 and 4 include a fine dot-like R-rich phase-containing structure 3 (hereinafter, may be referred to as a structure 3). Note that, different alloy pieces are observed in FIGS. 3 and 4. In the structure 3, a clear difference is found between the main phase and the R-rich phase. However, in the structure 3, the R-rich phases are aggregated in a dot form and are excessively dense as compared with the normal structure 7 shown in FIG. 1. Further, the dot-like R-rich phase is finer than a dot-like R-rich phase-containing structure 4 to be described later.

For example, a dimension of the dot-like R-rich phase included in the structure 3 may be 0.3 to 1.5 μm in a circle equivalent diameter, and the number of the dot-like R-rich phase in a unit area may be 0.25/ $\mu m^2$ or more.

Further, the structure 3 can be locally cut into parts where the circle equivalent diameter and a dense state of the dot-like R-rich phase are slightly different. In FIG. 4, a state for actually cutting is shown by a dashed line. A cut polygonal region may have a major axis of 10 μm or more and 120 μm or less, and a minor axis of 5 μm or more and 80 μm or less. The major axis refers to the longest distance of distances between two parallel lines in contact with each other from both sides of a polygon, and the minor axis refers to the shortest distance of the distances between the two parallel lines in contact with each other from the both sides of the polygon.

Figure 5:
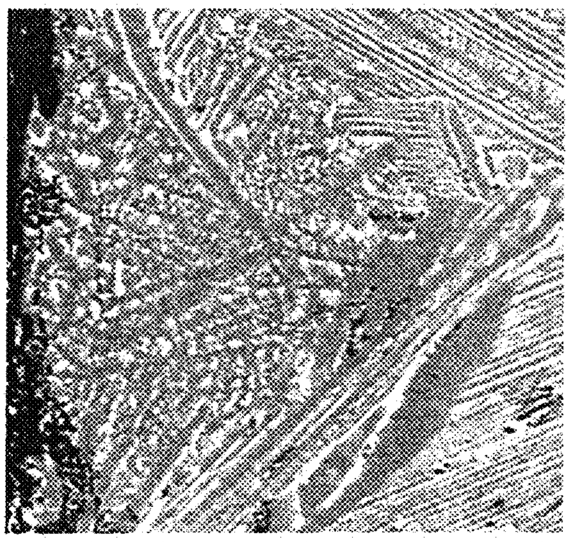
FIG. 5 is a backscattered electron image of a dot-like R-rich phase-containing structure.

FIG. 5 includes the dot-like R-rich phase-containing structure 4 (hereinafter, may be referred to as a structure 4). The structure 4 has a larger dot-like R-rich phase itself than the structure 3. Further, in a portion where the dot-like R-rich phases are aggregated, a phase darker than the main phase exists.

Figure 6:
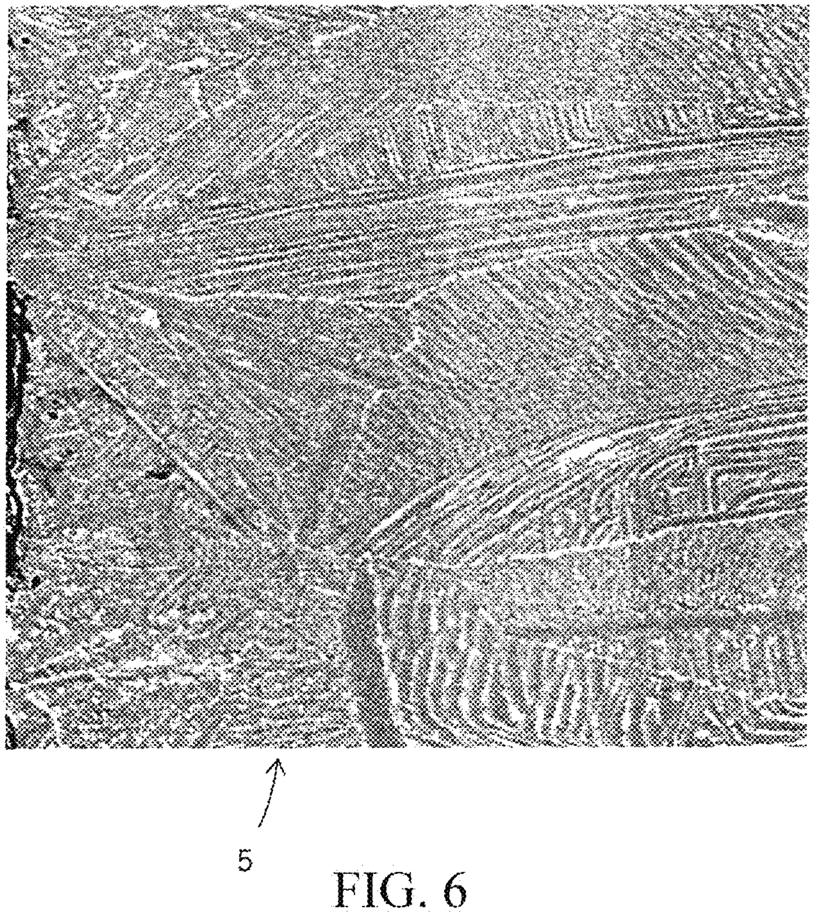
FIG. 6 is a backscattered electron image of a fine linear R-rich phase-containing structure.
Figure 7:
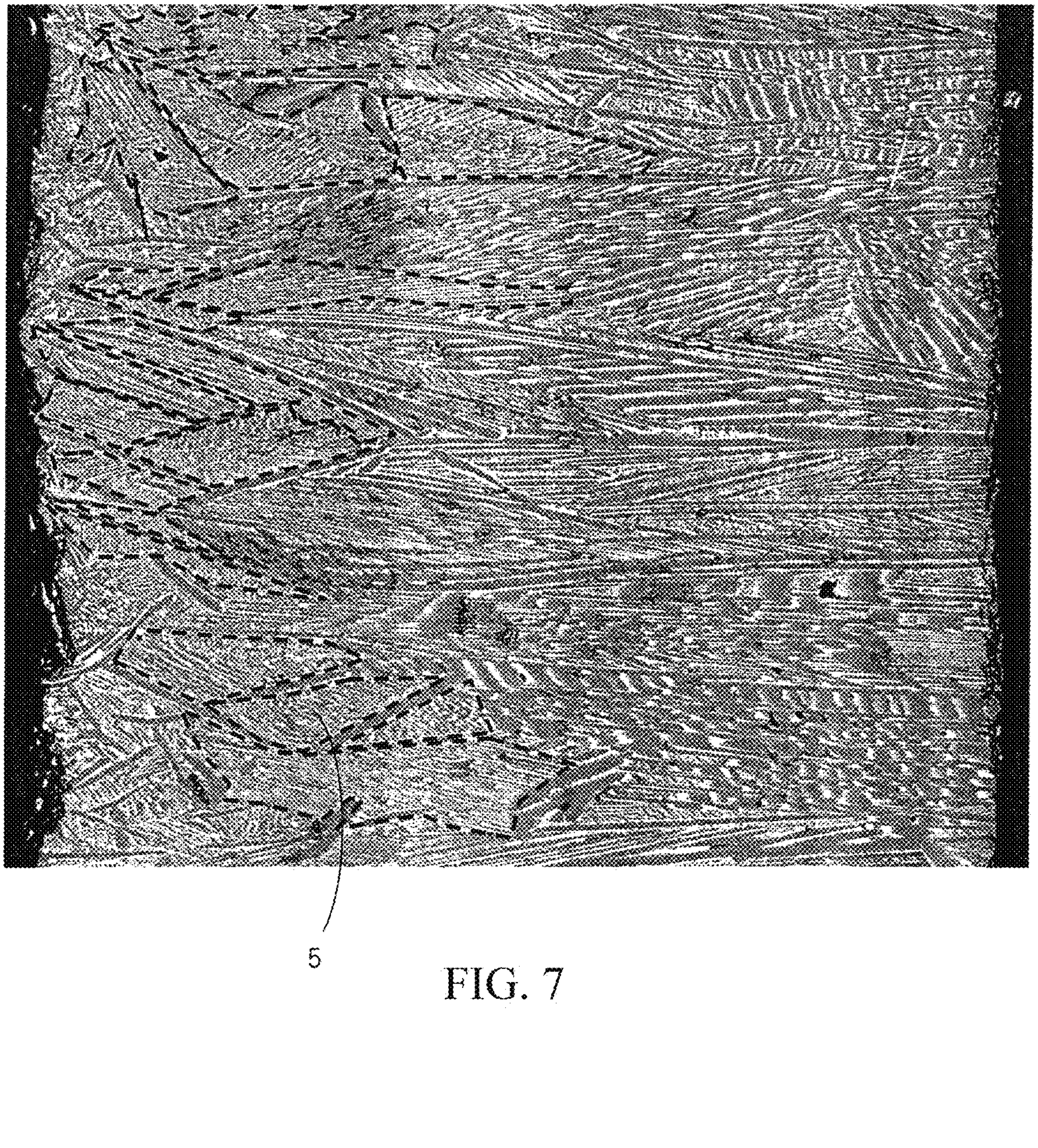
FIG. 7 is a backscattered electron image of the fine linear R-rich phase-containing structure.

FIGS. 6 and 7 include a fine linear R-rich phase-containing structure 5 (hereinafter, may be referred to as a structure 5). Note that, different alloy pieces are observed in FIGS. 6 and 7. In the structure 5, a clear difference is found between the main phase and the R-rich phase. However, in the structure 5, linear R-rich phases are thinner and are excessively dense as compared with the normal structure 7 shown in FIG. 1.

For example, a length of the linear R-rich phases contained in the structure 5 may be 4 to 125 μm, a width may be 0.3 to 10 μm, and an interval between the linear R-rich phases may be 1.0 to 1.8 μm.

Further, the structure 5 can be locally cut into parts where the length, the width, and a dense state of the linear R-rich phases are slightly different. In FIG. 7, a state for actually cutting is shown by a dashed line. A cut polygonal region may have a major axis of 30 μm or more and 200 μm or less, and a minor axis of 5 μm or more and 150 μm or less.

Figure 8:
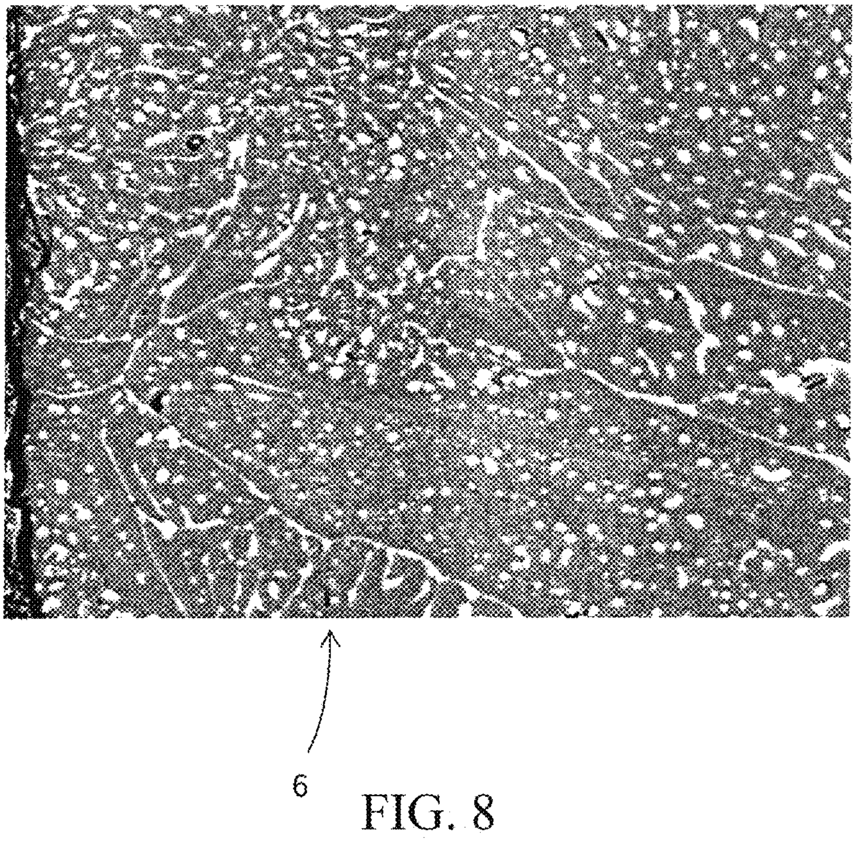
FIG. 8 is a backscattered electron image of a large dot-like R-rich phase-containing structure.

FIG. 8 includes a large dot-like R-rich phase-containing structure 6 (hereinafter, may be referred to as a structure 6). In the structure 6, the R-rich phases are aggregated to a large extent. Then, a luminance of the main phase around the aggregated R-rich phases is slightly increased. In addition, a linear R-rich phase may be sandwiched between the R-rich phases aggregated to a large extent.

The above-mentioned normal structure 7 and the six types of non-columnar crystal structures can be visually distinguished from the backscattered electron image of the cross section of the alloy of the R-T-B based permanent magnet.

<Calculation Method of Area Ratio of Non-Columnar Crystal Structure>

In the present embodiment, when an area ratio of a non-columnar crystal structure in a cross section of an alloy for an R-T-B based permanent magnet is calculated, luminance analysis of a backscattered electron image is used. Hereinafter, a method of luminance analysis will be described.

First, brightness and contrast of an electron microscope are adjusted in preparation for the luminance analysis.

First, an alloy plate for the R-T-B based permanent magnet used for a standard sample is prepared. The alloy plate for the R-T-B based permanent magnet may be used as it is, or a heat-treated plate obtained by performing a heat treatment on the alloy plate for the R-T-B based permanent magnet may be used. Performing a heat treatment facilitates a step of bringing only the main phase 11 into a field of view of the electron microscope. As a result, the brightness and the contrast of the electron microscope can also be easily adjusted. When the heat treatment is performed, the heat treatment time and temperature are not particularly limited. For example, the heat treatment is performed at 800° C. to 1000° C. for 30 to 120 minutes.

Next, a Ni thin plate, a Cu thin plate, and a Zn thin plate are prepared, and the alloy plate for the R-T-B based permanent magnet, the Ni thin plate, the Cu thin plate, and the Zn thin plate are embedded in a resin for electron microscope observation. At this time, the standard sample is prepared by arranging the plates such that cross sections are lined up parallel to a thickness direction of each plate. At this time, the type of the thin plates other than the alloy plate for the R-T-B based permanent magnet is not particularly limited, and at least two types of the thin plates may be used. Luminance peak positions of metals and a difference between the luminance peak positions of the metals, which will be described later, may be appropriately set depending on the type of the thin plates. In the following description, a case where the Ni thin plate, the Cu thin plate, and the Zn thin plate are used will be described.

Next, the cross section of the standard sample is mirror-polished and gold-deposited.

Next, the standard sample is set in the electron microscope. An imaging mode is a backscattered electron imaging mode, and the number of pixels is 1280×960 pixels. A magnification is not particularly limited, but the magnification is set such that the Ni thin plate, Cu thin plate, and Zn thin plate can be in the same field of view.

Next, the field of view is moved so that the Ni thin plate, the Cu thin plate, and the Zn thin plate are in the same field of view in this order.

Next, a luminance histogram is created with 256 gradations where the minimum luminance is 0 and the maximum luminance is 255, and the brightness is adjusted so that a luminance peak position of Cu is about 150 (145 to 155). Further, the contrast is adjusted so that a difference between a luminance peak position of Ni and the luminance peak position of Cu is about 55 (45 to 65), and a difference between the luminance peak position of Cu and a luminance peak position of Zn is about 45 (35 to 55). When the contrast is adjusted, in order to maintain a state where the luminance peak position of Cu is about 150, the brightness is supplementarily adjusted as necessary.

Next, while maintaining the contrast, the field of view of the electron microscope is moved to a position where the alloy plate for the R-T-B based permanent magnet enters. Then, the magnification is increased, so that a white phase (R-rich phase 13) does not enter the field of view, and only the main phase 11 enters the field of view. The maximum magnification may be about 10,000 times. Further, the brightness is adjusted so that a peak position of the luminance histogram is about 110 (105 to 115). Finally, the standard sample is recovered from the electron microscope.

Next, the method of luminance analysis will be described.

First, the alloy for an R-T-B based permanent magnet for performing the luminance analysis is prepared. Next, the alloy for an R-T-B based permanent magnet is processed so that the cross section can be observed, and an evaluation sample is prepared. Results obtained by preparing a plurality of evaluation samples may be averaged.

Next, the imaging mode is set as a backscattered electron imaging mode, and an observation range is set with the magnification of 350 times and the number of pixels of 1280×960 pixels. With the above magnification and the number of pixels, the observation range is 360 μm×270 μm.

Figure 9:
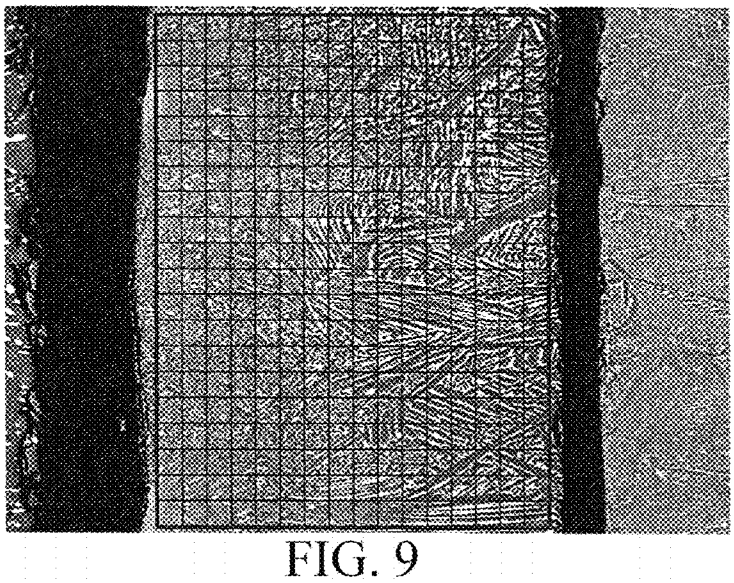
FIG. 9 is a backscattered electron image in which an evaluation sample is divided into sections.

Next, a portion of the evaluation sample included in the above observation range is divided into sections at regular intervals. A dimension of one section is, for example but not particularly limited to 40 pixels or more and 60 pixels or less. FIG. 9 shows an image obtained by actually observing the cross section of the evaluation sample and dividing the dimension of one section into 50 pixels. A cross section parallel to a thickness direction of the alloy for an R-T-B based permanent magnet is observed, and a size of the image in FIG. 9 is 1280 pixels (=360 μm) in a horizontal direction and 960 pixels (=270 μm) in a vertical direction in the entire FIG. 9.

Figure 10:
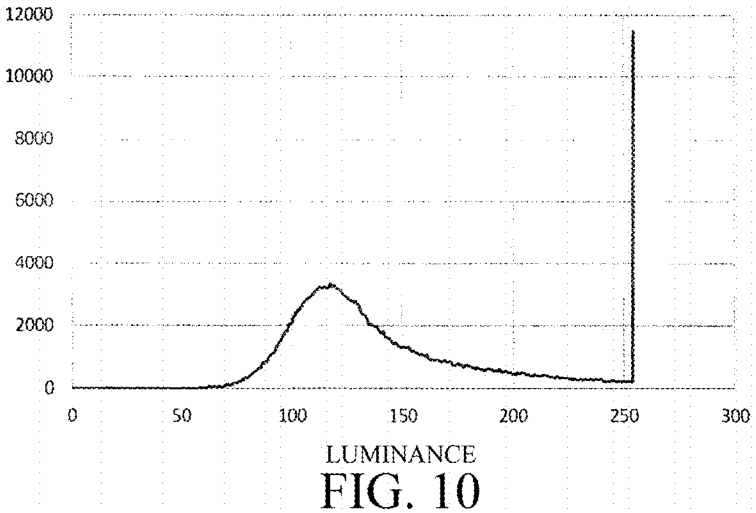
FIG. 10 is a luminance histogram in one section of FIG. 9.

Next, a luminance histogram is created for each section. For example, FIG. 10 shows a result of creating the luminance histogram for a seventh section from the top and a third section from the left in FIG. 9. Then, a peak position and a standard deviation (σ) of the luminance histogram are acquired for each section.

The present inventors have newly found the following. A section in which the peak position of the luminance histogram is 130 or more and 200 or less and the σ is 20 or more and 40 or less can be regarded as the non-columnar crystal structure. A number ratio of the sections in which the peak position and the σ of the luminance histogram are within the above range to all the sections can be regarded as the area ratio of the non-columnar crystal structure. The R-T-B based permanent magnet manufactured by using the alloy for an R-T-B based permanent magnet in which the area ratio of the non-columnar crystal structure is 1.0% or more and 30.0% or less has good magnetic properties. In particular, it was found that HcJ at a high temperature tends to increase when the area ratio of the non-columnar crystal structure is 1.0% or more. In addition, it was found that Hk/HcJ at the room temperature tends to increase when the area ratio of the non-columnar crystal structure is 30.0% or less. It was found that the area ratio of the non-columnar crystal structure may be 4.0% or more and 30.0% or less.

Further, a section in which the peak position of the luminance histogram is 130 or more and 200 or less and the σ is 30 or more and 40 or less can be regarded as a structure other than the chill crystal structure in the non-columnar crystal structure. In addition, it was found that an area ratio of the structure other than the chill crystal structure in the non-columnar crystal structure may be 50% or more, may be 85% or more and 95% or less, and may be 87% or more and 91% or less.

Hereinafter, a relationship between the above luminance histogram and the structure of the alloy for an R-T-B based permanent magnet will be further described. The present inventors have found that the R-T-B based permanent magnet manufactured by using the alloy for an R-T-B based permanent magnet in which the area ratio of the non-columnar crystal structure is within a specified range has good magnetic properties. However, since a distinction between the normal structure and the non-columnar crystal structure by visually observing the backscattered electron image depends on subjectivity of a measurer, different results may be obtained by the measurer.

The present inventors considered that if the area ratio of the non-columnar crystal structure is calculated using the luminance analysis, the area ratio of the non-columnar crystal structure that does not depend on the measurer can be calculated. Therefore, the present inventors observed the cross sections of a large number of alloys for the R-T-B based permanent magnet. In addition, the backscattered electron image of the cross section can be classified into the normal structure and six types of non-columnar crystal structures by visually observing the backscattered electron image of the cross section. Then, when the luminance histogram is created for each structure, the tendency of the peak position and σ were observed.

As a result, it was found that most of the luminance histograms of the sections which are the non-columnar crystal structures have the peak position of 130 or more and 200 or less and the σ of 20 or more and 40 or less. In contrast, it was found that most of the luminance histograms of the sections which are the normal structures have peak positions and/or σ outside the above range. In the luminance histograms of the sections which are the normal structures, there were many sections having a particularly large σ.

Figure 11:
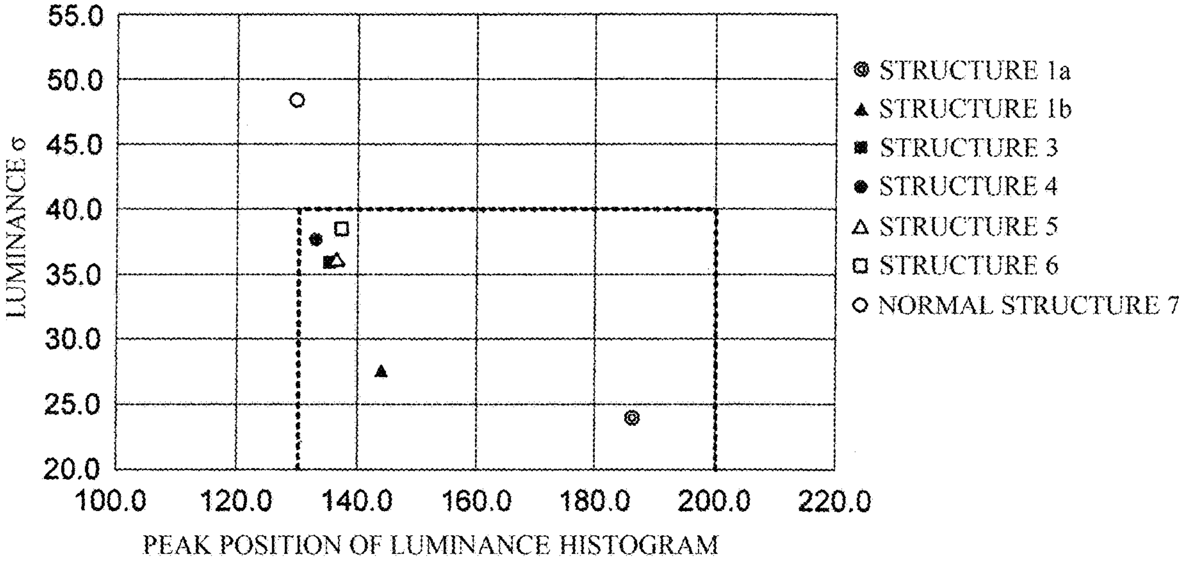
FIG. 11 is a graph showing a difference in a peak position and σ of a luminance histogram depending on a structure.

FIG. 11 shows an average peak position and an average σ of a plurality of sections corresponding to the normal structures and a plurality of sections corresponding to six types of non-columnar crystal structures in the alloy for an R-T-B based permanent magnet having specific compositions. Most of the sections corresponding to any of the structure 1*a*, the structure 1*b*, and the structure 3 to the structure 6 have the peak positions of 130 or more and 200 or less and the σ of 20 or more and 40 or less. Even when the compositions of the alloy for an R-T-B based permanent magnet were changed, the average peak position and the average σ of each structure did not change greatly unless a method for adjusting brightness and contrast of an electron microscope was changed.

The present inventors have found that the R-T-B based permanent magnet manufactured by using the alloy for an R-T-B based permanent magnet in which the area ratio of the non-columnar crystal structure calculated using the luminance analysis is 1.0% or more and 30.0% or less has good magnetic properties.

If the dimension of one section is too large for each section for creating the luminance histogram, it is likely that two or more different structures are included in the same section. If the dimension of one section is too small, the number of pixels contained in each section will decrease, so that an accuracy of the luminance histogram created for each section will decrease. As a result, the peak position and the σ of the luminance histogram are unclear. That is, the dimension of one section has an appropriate range depending on the type of the alloy or the like.

<Composition of Alloy for R-T-B Based Permanent Magnet>

The composition of the alloy for an R-T-B based permanent magnet is not particularly limited. R represents at least one of rare earth elements. The rare earth elements are Sc, Y, and Lanthanide that belong to the third group of the long period type periodic table. Lanthanide includes, for example, La, Ce, Pr, Nd, Sm, Eu, Gd, Tb, Dy, Ho, Er, Tm, Yb, and Lu. The rare earth elements are classified into light rare earth elements and heavy rare earth elements, the heavy rare earth elements refer to Gd, Tb, Dy, Ho, Er, Tm, Yb, and Lu, and the light rare earth elements refer to rare earth elements other than the heavy rare earth elements. In the present embodiment, Nd and/or Pr may be contained as R from the viewpoint of suitably controlling a manufacturing cost and the magnetic properties. In addition, both of the light rare earth elements and the heavy rare earth elements may be contained, especially from the viewpoint of improving the HcJ. A content of the heavy rare earth elements is not particularly limited, and thus the heavy rare earth elements may not be contained. The content of the heavy rare earth elements is, for example, 5 mass % or less (including 0 mass %).

R content may be 29.0 mass % or more and 33.5 mass % or less. When the R content is small, the HcJ of the obtained R-T-B based permanent magnet tends to decrease. When the R content is large, Br tends to decrease.

B content may be 0.70 mass % or more and may be 0.80 mass % or more. the B content may be less than 1.0 mass %, less than 0.96 mass %, or less than 0.90 mass %. When the B content is smaller than a stoichiometric ratio, specifically, when the B content is less than 1.0 mass %, the area ratio of the non-columnar crystal structure tends to be 1.0 to 30.0%. In addition, when the B content is small, the Hk/HcJ tends to decrease. Further, abnormal grain growth is likely to occur when sintering at a high temperature. In addition, the Hk/HcJ is less likely to increase when sintering at a low temperature. When the B content is large, the abnormal grain growth is likely to occur. Then, the Br tends to decrease.

T is at least one of transition metal elements. T may be Fe alone or Fe and Co. Co content may be 0 mass % or more and 2.0 mass % or less. As the Co content is smaller, the abnormal grain growth is more likely to occur when sintering at the high temperature. In addition, the Hk/HcJ is less likely to increase when sintering at the low temperature. When the Co content is large, Br and HcJ decrease. In addition, the alloy for R-T-B based permanent magnet according to the present embodiment tends to be expensive.

The alloy for an R-T-B based permanent magnet may contain M. M is one or more selected from Cu, Ga, Zr, and Al. A total content of M is not particularly limited. The total content of M may be 0.1 mass % or more and 2.0 mass % or less.

Cu content is not particularly limited. For example, the Cu content may be 0.05 mass % or more and 0.50 mass % or less. When the Cu content is 0.05 mass % or more, the abnormal grain growth is less likely to occur when sintering at the high temperature. In addition, the Hk/HcJ tends to be sufficiently high even when sintering at the low temperature. When the Cu content is 0.50 mass % or less, Br tends to be improved.

Ga content is not particularly limited. For example, the Ga content may be 0 mass % or more and 1.0 mass % or less. When Ga is contained, the abnormal grain growth is less likely to occur when sintering at the high temperature. Further, the Hk/HcJ tends to be sufficiently high even when sintering at the low temperature. Furthermore, the HcJ also tends to be improved. When the Ga content is 1.0 mass % or less, Br tends to be improved.

Al content is not particularly limited. For example, the Al content may be 0.05 mass % or more and 1.00 mass % or less. When the Al content is 0.05 mass % or more, the HcJ tends to be improved. In addition, the abnormal grain growth is less likely to occur even when sintering at the high temperature. Further, the Hk/HcJ tends to be sufficiently high even when sintering at the low temperature. When the Al content is 1.00 mass % or less, Br tends to be improved.

Zr content is not particularly limited. For example, the Zr content may be 0.05 mass % or more and 1.00 mass % or less. When the Zr content is 0.05 mass % or more, the Hk/HcJ tends to be sufficiently high even when sintering at the low temperature. In addition, the abnormal grain growth is less likely to occur even when sintering at the high temperature. When the Zr content is 1.00 mass % or less, Br tends to be improved.

Fe content is a substantial balance in constituents of the alloy for an R-T-B based permanent magnet. The fact that the Fe content is the substantial balance means that a total content of elements other than R, Fe, Co, B, and M is 1.0 mass % or less.

The R-T-B based permanent magnet manufactured by using the alloy of the R-T-B based permanent magnet according to the present embodiment is processed into any shape and used. A shape of the R-T-B based permanent magnet is not particularly limited, and for example, can be any shape such as a columnar shape of a rectangular parallelepiped, a hexahedron, a tabular shape, and a quadrangular pole, and a cylindrical shape in which a cross-sectional shape of the R-T-B based permanent magnet is C-shaped.

In addition, the R-T-B based permanent magnet includes both a magnet product obtained by processing and magnetizing the magnet and a magnet product not magnetizing the magnet.

<Method for Manufacturing Alloy for R-T-B Based Permanent Magnet>

As an example of a method for manufacturing an alloy for an R-T-B based permanent magnet, a manufacturing method by a strip casting method using a casting equipment shown in FIG. 12 will be described.

Figure 12:
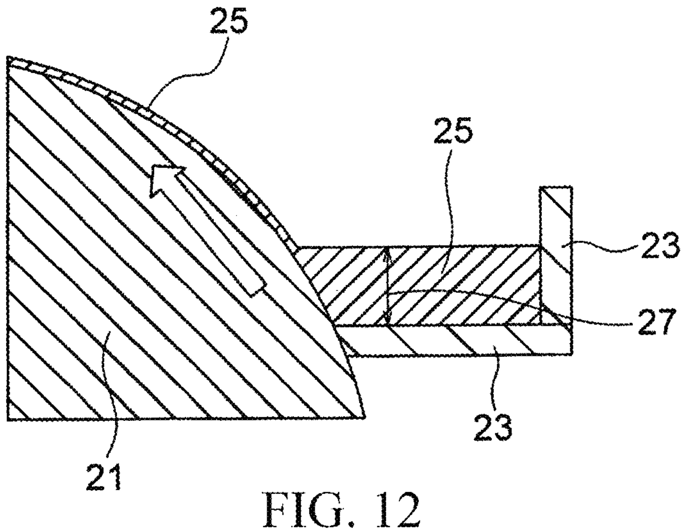
FIG. 12 is a schematic diagram of a casting equipment.

The casting equipment shown in FIG. 12 has a cooling roll 21 and a tundish 23. In addition, although not shown in FIG. 12, the casting equipment may have components well known as components of the casting equipment, such as a refractory crucible and a collection container. A type of the refractory crucible is not particularly limited. Examples thereof include an alumina crucible, a mullite crucible, and a zirconia crucible. A material of the cooling roll 21 is not particularly limited. For example, copper, a copper alloy, those obtained by plating or thermal spraying a surface of copper, those obtained by plating or thermal spraying a surface of the copper alloy, and the like can be mentioned.

First, raw material metals are weighed as alloy compositions of a target alloy for an R-T-B based permanent magnet, and mixed to obtain a raw material mixture.

Next, the obtained raw material mixture is loaded into the refractory crucible, and the loaded raw material mixture is melted to obtain an alloy molten metal. A method for melting the raw material mixture is not particularly limited. For example, a method for arranging the refractory crucible loaded with the raw material mixture in a high-frequency vacuum induction furnace and heating the refractory crucible can be mentioned.

Then, by the strip casting method using the casting equipment shown in FIG. 12, the obtained alloy molten metal is cast to obtain a cast alloy flake (the alloy for an R-T-B based permanent magnet). Specifically, an alloy molten metal 25 is supplied to the cooling roll 21 whose inside is water-cooled via the tundish 23. The alloy molten metal 25 supplied onto the cooling roll 21 is cooled and separated from the cooling roll 21 on an opposite side of the tundish 23, and is recovered as the cast alloy flake.

A surface of the cast alloy flake that is in contact with the cooling roll 21 is a roll surface, and a surface of the cast alloy flake that is opposite to the roll surface is a free surface. The roll surface is quenched by the cooling roll 21 as compared with the free surface. Here, a non-columnar crystal structure is likely to be formed than a normal structure when a cooling rate is higher. In the non-columnar crystal structure, a chill crystal structure is likely to be formed when the cooling rate is particularly high. Therefore, the roll surface is more likely to form the non-columnar crystal structure than the free surface. All of FIGS. 1 to 9 have the roll surface on the left side.

The area ratio of the non-columnar crystal structure mainly changes depending on a temperature (casting temperature) of the alloy molten metal 25, a composition of the alloy molten metal 25, a roll surface roughness Rz of the cooling roll 21, a concave-convex shape affecting the roll surface roughness Rz, a molten metal head pressure 27, a roll peripheral speed of the cooling roll 21, and a supply speed of the alloy molten metal 25 to the cooling roll 21 (supply speed per unit contact width between the alloy molten metal 25 and the cooling roll 21). The temperature of the alloy molten metal 25 is, for example, 1300° C. to 1600° C. The roll surface roughness Rz of the cooling roll 21 is, for example, 10 μm to 50 μm. The roll peripheral speed of the cooling roll 21 is, for example, 0.5 m/s to 2.5 m/s. The supply speed of the alloy molten metal 25 to the cooling roll 21 is, for example, 0.5 kg/(min·cm) to 2.5 kg/(min·cm).

Hereinafter, the molten metal head pressure 27 will be described. The molten metal head pressure 27 is a depth of the alloy molten metal 25 in contact with the cooling roll 21. The larger the molten metal head pressure 27, the stronger a pressure at which the alloy molten metal 25 is pressed against the cooling roll 21 by its own weight. Therefore, the larger the molten metal head pressure 27, the stronger an adhesion between the alloy molten metal 25 and the cooling roll 21, and the higher a heat transfer coefficient from the alloy molten metal 25 to the cooling roll 21. At the same time, a length of the alloy molten metal 25 in contact with the cooling roll 21 also changes. Therefore, if other conditions are the same, the higher the molten metal head pressure 27, the thicker the cast alloy flake. Actually, the molten metal head pressure 27 is appropriately selected in accordance with other casting conditions.

As described above, the higher the cooling rate, the easier it is for the non-columnar crystal structure (chill crystal structure) to be formed. Therefore, the larger the molten metal head pressure 27, the larger the area ratio of the non-columnar crystal structure (chill crystal structure) tends to be.

As a method for increasing the molten metal head pressure 27, a method for increasing an amount of the alloy molten metal 25 in the tundish 23 can be mentioned. As a method for increasing the amount of the alloy molten metal 25 in the tundish 23, a method for increasing the supply speed of the alloy molten metal 25 to the tundish 23 can be mentioned. The higher the supply speed of the alloy molten metal 25 to the tundish 23, the thicker the cast alloy flake. As a method for increasing the molten metal head pressure 27 without changing a thickness of the cast alloy flake, a method for increasing the peripheral speed of the cooling roll 21 can be mentioned.

That is, when the cast alloy flake having the same thickness is manufactured, if the supply speed of the alloy molten metal 25 is high and the peripheral speed of the cooling roll 21 is high, the molten metal head pressure 27 is large, and if the supply speed of the alloy molten metal 25 is low and the peripheral speed of the cooling roll 21 is low, the molten metal head pressure 27 is small.

<Method for Manufacturing R-T-B Based Permanent Magnet>

A method for manufacturing an R-T-B based permanent magnet by using the alloy for an R-T-B based permanent magnet manufactured by the above method is not particularly limited. For example, a method having following steps can be mentioned:

(a) a pulverization step of pulverizing the alloy for an R-T-B based permanent magnet;
(b) a pressing step of pressing obtained alloy powders;
(c) a sintering step of sintering a green compact to obtain the R-T-B based permanent magnet;
(d) an aging treatment step of subjecting the R-T-B based permanent magnet to an aging treatment;
(e) a cooling step of cooling the R-T-B based permanent magnet;
(f) a machining step of machining the R-T-B based permanent magnet;
(g) a grain boundary diffusion step of diffusing heavy rare earth elements into a grain boundary of the R-T-B based permanent magnet; and
(h) a surface treatment step of subjecting the R-T-B based permanent magnet to a surface treatment.

[Pulverization Step]

The alloy for an R-T-B based permanent magnet is pulverized (pulverization step). The pulverization step includes a coarse pulverization step of pulverizing until a particle size is several hundred μm to several mm or so, and a fine pulverization step of finely pulverizing until a particle size is several μm or so.

(Coarse Pulverization Step)

The alloy for an R-T-B based permanent magnet is coarsely pulverized until the particle size is several hundred μm to several mm or so (coarse pulverization step). Therefore, a coarsely pulverized powder of the alloy for an R-T-B based permanent magnet is obtained. For example, after hydrogen is stored in the alloy for an R-T-B based permanent magnet, hydrogen is released due to different hydrogen storage amounts between different phases, and dehydrogenation is carried out, which causes a self-collapsing pulverization (hydrogen storage pulverization), therefore the coarse pulverization can be carried out.

Other than using the above-mentioned hydrogen storage pulverization, the coarse pulverization step may be carried out by using a coarse pulverizer such as a stamp mill, a jaw crusher, and a Brown mill, in inert gas atmosphere.

An oxygen concentration is adjusted by regulating atmosphere in each manufacturing step. From the point of obtaining high magnetic properties, an oxygen amount of the R-T-B based permanent magnet obtained at the end may be reduced. Therefore, the oxygen concentration of each step from the pulverization step to the sintering step described below may be 100 ppm or less.

(Fine Pulverization Step)

After coarsely pulverizing the alloy for an R-T-B based permanent magnet, the obtained coarsely pulverized powder of the alloy for an R-T-B based permanent magnet is finely pulverized until an average particle size is several μm or so (fine pulverization step). Therefore, a finely pulverized powder of the alloy for an R-T-B based permanent magnet is obtained. By further finely pulverizing the coarsely pulverized powder, for example, the finely pulverized powder having particles of 1 μm or more and 10 μm or less, or 3 μm or more and 5 μm or less can be obtained.

The fine pulverization is carried out by further pulverizing the coarsely pulverized powder using a fine pulverizer such as a jet mill, a ball mill, a vibrating mill, and a wet attritor while regulating the condition such as pulverization time as appropriate. The fine pulverization using the jet mill is a method of pulverization in which a high pressure inert gas (for example, $N_2$ gas) is released from a narrow nozzle to generate a high speed gas flow, and this high speed gas flow accelerates the coarsely pulverized powder of a raw material alloy to collide against each other or collide with a target or a container wall.

When the coarsely pulverized powder of the raw material alloy is finely pulverized, by adding a pulverization aid such as zinc stearate, urea, amide stearate, and oleic amide, the finely pulverized powder with high orientation can be obtained during pressing.

[Pressing Step]

The finely pulverized powder is pressed into a desired shape (pressing step). The pressing step is carried out by filling the finely pulverized powder in a mold arranged in electromagnets and then applying a pressure, thereby pressing the finely pulverized powder into any shape. At this time, a magnetic field is applied, a predetermined orientation of the finely pulverized powder is formed by applying the magnetic field, and pressing is done in the magnetic field while a crystal axis is oriented. Therefore, the green compact is obtained. The obtained green compact is oriented in a specific direction, and thus the R-T-B based permanent magnet having a high magnetic anisotropy is obtained.

A pressure of 30 MPa to 300 MPa may be applied during the pressing. A magnetic field of 950 kA/m to 1600 kA/m may be applied. The applied magnetic field is not limited to a static magnetic field, and can be a pulse magnetic field. The static magnetic field and the pulse magnetic field can be used together.

As a pressing method, in addition to the dry pressing in which the finely pulverized powder is directly pressed as described above, wet pressing in which a slurry obtained by dispersing the finely pulverized powder in a solvent such as oil is pressed can be applied.

A shape of the green compact obtained by pressing the finely pulverized powder is not particularly limited, and for example, can be any shape depending on a desired shape of the R-T-B based permanent magnet such as a rectangular parallelepiped shape, a tabular shape, a columnar shape, and a ring shape.

[Sintering Step]

The green compact formed into a desired shape obtained by pressing in the magnetic field is sintered in a vacuum or in the inert gas atmosphere, and the R-T-B based permanent magnet is obtained (sintering step). A sintering temperature needs to be regulated depending on various conditions such as a composition, a pulverization method, an average of the particle size and particle size distribution. For example, sintering is done by heating the green compact in the vacuum or in the presence of the inert gas at 1000° C. or higher and 1200° C. or lower for 1 hour or longer to 48 hours or shorter. Therefore, the finely pulverized powder undergoes liquid phase sintering, and the R-T-B based permanent magnet (a sintered body of the R-T-B based magnet) having an improved volume ratio of main phase grains can be obtained. After obtaining the sintered body by sintering the green compact, from the point of improving a production efficiency, the sintered body may be quenched.

[Aging Treatment Step]

After sintering the green compact, aging treatment is performed on the R-T-B based permanent magnet (aging treatment step). After sintering, the aging treatment is performed on the R-T-B based permanent magnet by maintaining the obtained R-T-B based permanent magnet at a temperature lower than that during sintering. A condition of the treatment is regulated appropriately depending on the number of times of the aging treatment such as two-step heating of heating for 10 minutes to 6 hours at a temperature of 700° C. or higher and 1000° C. or lower and further heating for 10 minutes to 6 hours at a temperature of 500° C. to 700° C.; or one-step heating of heating for 10 minutes to 6 hours at a temperature around 600° C. By carrying out such aging treatment, the magnetic properties of the R-T-B based permanent magnet can be improved. In addition, the aging treatment step may be carried out after the machining step which is described below.

[Cooling Step]

After carrying out the aging treatment on the R-T-B based permanent magnet, the R-T-B based permanent magnet is quenched in Ar gas atmosphere (cooling step). Therefore, the R-T-B based permanent magnet according to the present embodiment can be obtained. The cooling rate is not particularly limited, and may be 30° C./min or more.

[Machining Step]

The obtained R-T-B based permanent magnet may be machined into a desired shape as necessary (machining step). A machining method may be, for example, shape processing such as cutting, and grinding, and chamfering processing such as barrel polishing.

[Grain Boundary Diffusion Step]

The heavy rare earth elements may be further diffused to the grain boundary of the machined R-T-B based permanent magnet (grain boundary diffusion step). A method of grain boundary diffusion is not particularly limited. For example, a compound including the heavy rare earth elements may be adhered on a surface of the R-T-B based permanent magnet by coating, deposition, and the like, and then the heat treatment may be carried out, therefore the grain boundary diffusion may be performed. In addition, the R-T-B based permanent magnet may be heat-treated in atmosphere including vapor of the heavy rare earth elements, therefore the grain boundary diffusion may be performed. HcJ of the R-T-B based permanent magnet can further be enhanced by performing the grain boundary diffusion.

[Surface Treatment Step]

The R-T-B based permanent magnet obtained by the above-mentioned steps may be further subjected to a surface treatment such as plating, resin coating, an oxidizing treatment, and a chemical treatment (surface treatment step).

In the present embodiment, the machining step, the grain boundary diffusion step, and the surface treatment step are performed, however, these steps do not necessarily have to be performed.

The R-T-B based permanent magnet according to the present embodiment obtained as described above has good magnetic properties and also a wide sintering temperature range. As a result, the R-T-B based permanent magnet according to the present embodiment can be produced stably.

The R-T-B based permanent magnet according to the present embodiment obtained as such is suitably used as a magnet in, for example, a surface permanent magnet (SPM) type rotating machine with a magnet attached on a surface of a rotor, an interior permanent magnet (IPM) type rotating machine such as an inner rotor type brushless motor and a permanent magnet reluctance motor (PRM). Specifically, the R-T-B based permanent magnet according to the present embodiment is suitably used for a spindle motor for a hard disk rotating drive in a hard disk drive, a voice coil motor in a hard disk drive, a motor for an electric automobile or a hybrid car, a motor for an electric power steering in an automobile, a servo motor for a machine tool, a motor for a vibrator of a mobile phone, a motor for a printer, a motor for generator, and the like.

The present disclosure is not limited to the above described embodiment and can be variously modified within the scope of the present disclosure.

EXAMPLES

Hereinafter, the present disclosure is described in more detail with reference to Examples, however, the present disclosure is not limited to these Examples.

(Manufacturing of Alloy for R-T-B Based Permanent Magnet)

Nd metal (purity: 99 mass % or more), an alloy of Nd and Pr (didymium, purity: 99 mass % or more), Tb metal (purity: 99 mass % or more), ferroboron (Fe content: 80 mass %, B content: 20 mass %), Fe metal (purity: 99 mass % or more), Co metal (purity: 99 mass % or more), Zr metal (purity: 99 mass % or more), Cu metal (purity: 99 mass %), Al metal (purity: 99 mass % or more), and Ga metal (purity: 99 mass % or more) were weighed as alloy compositions shown in Table 1 below, and mixed to obtain a raw material mixture. In Table 1, "T.RE" is a total content (mass %) of rare earth elements (Nd, Pr, Dy, and Tb), and "T.RL" is a total content (mass %) of light rare earth elements (Nd and Pr). "bal." is a balance. A reason why the content of Fe is referred to as "bal." is that the content of Fe is a balance in a case where a total amount of an alloy for an R-T-B based permanent magnet containing elements other than the elements described in Table 1 is 100 mass %.

The obtained raw material mixture was loaded into an alumina crucible. After the alumina crucible loaded with the raw material mixture was arranged in a high-frequency vacuum induction furnace, the inside of the high-frequency vacuum induction furnace was replaced with Ar. Then, by heating the inside of the high-frequency vacuum induction furnace, the raw material mixture loaded in the alumina crucible was melted to obtain an alloy molten metal. By a strip casting method using a casting equipment shown in FIG. 12, the obtained alloy molten metal was cast to obtain a cast alloy flake (the alloy for an R-T-B based permanent magnet). Casting was done in an Ar atmosphere.

A temperature of the alloy molten metal, a roll surface roughness Rz of a cooling roll, and a molten metal head pressure were appropriately selected so as to obtain the alloy for an R-T-B based permanent magnet described in Table 2. Specifically, the temperature (casting temperature) of the alloy molten metal was appropriately selected within a range of 1300° C. to 1600° C., the roll surface roughness Rz of the cooling roll was appropriately selected within a range of 5 μm to 50 μm, and the molten metal head pressure was appropriately selected within a range of 5 mm to 25 mm. In addition, a material of the cooling roll was a copper alloy. A roll peripheral speed of the cooling roll and a supply speed of the molten metal to the cooling roll (a supply speed per unit contact width between the molten metal and the cooling roll) were adjusted to values shown in Table 2 below.

(Adjustment of Electron Microscope)

A cross section of the obtained alloy for an R-T-B based permanent magnet was observed with an electron microscope (manufactured by JEOL Ltd., Japan), and the brightness and contrast of the electron microscope were adjusted as preparation for calculating an area ratio of a non-columnar crystal structure by luminance analysis.

First, the obtained alloy for an R-T-B based permanent magnet was heat-treated at 1000° C. for 120 minutes to obtain two heat-treated plates to be incorporated into a standard sample.

Next, a Ni thin plate having a thickness of 0.1 mm, a Cu thin plate having a thickness of 0.1 mm, and a Zn thin plate having a thickness of 0.1 mm were prepared. Next, the heat-treated plate, the Ni thin plate, the Cu thin plate, and the Zn thin plate were embedded in a resin for electron microscope observation. At this time, the standard sample was prepared by arranging the heat-treated plate, the Ni thin plate, the Cu thin plate, the Zn thin plate, and the heat-treated plate in this order such that cross sections were lined up parallel to a thickness direction of each plate.

Next, the cross section of the standard sample was mirror-polished and gold-deposited.

Next, the standard sample was set in the electron microscope. Next, an imaging mode was set as a backscattered electron imaging mode, and an observation range was set with a magnification of 150 times and the number of pixels of 1280×960 pixels.

Next, a field of view was adjusted such that the Ni thin plate, the Cu thin plate, and the Zn thin plate were in the same field of view in this order.

Next, a luminance histogram was created with 256 gradations where the minimum luminance was 0 and the maximum luminance was 255, and the brightness was adjusted such that a luminance peak position of Cu was about 150 (145 to 155). Further, the contrast was adjusted such that a difference between a luminance peak position of Ni and the luminance peak position of Cu was about 55 (45 to 65), and a difference between the luminance peak position of Cu and a luminance peak position of Zn was about 45 (35 to 55). When the contrast was adjusted, in order to maintain a state where the luminance peak position of Cu was about 150, the brightness was supplementarily adjusted as necessary.

Next, while maintaining the contrast, the field of view was moved to a position where the heat-treated plate enters. Then, the magnification was increased, so that a white phase (R-rich phase 13) did not enter the field of view, and only the main phase 11 entered the field of view. The maximum magnification was about 10,000 times. Further, the brightness was adjusted such that a peak position of the luminance histogram was about 110 (105 to 115). Finally, the standard sample was recovered from the electron microscope.

(Measurement of Area Ratio of Non-Columnar Crystal Structure)

The area ratio of the non-columnar crystal structure in the alloy for an R-T-B based permanent magnet was measured using the electron microscope whose brightness and contrast were adjusted by the above method.

First, an evaluation sample was taken. Specifically, in a step of supplying the alloy for an R-T-B based permanent magnet to one manufacturing lot by the above strip casting method, an alloy piece was sampled at a certain time interval from a supplied alloy for an R-T-B based permanent magnet. Thirty alloy pieces were randomly taken from the alloy for an R-T-B based permanent magnet, and each alloy piece was used as the evaluation sample.

Next, a thickness of the taken evaluation sample was measured. Among the thirty evaluation samples, 2nd, 3rd, and 4th thick samples were selected as thick samples, 14th, 15th, and 16th thick samples were selected as near-average samples, and 27th, 28th, and 29th thick samples were selected as thin samples.

Next, nine selected evaluation samples were attached with an instant adhesive and processed such that the cross section parallel to the thickness direction could be observed. In addition, when the evaluation samples were attached, the evaluation samples were arranged such that it could be seen which evaluation sample was the thick sample, the near-average sample, or the thin sample.

Next, the nine evaluation samples attached with the instant adhesive were collectively resin-embedded so as to be one sample. Then, the cross section parallel to the thickness direction was mirror-processed to obtain an observation surface.

Next, the imaging mode was set as the backscattered electron imaging mode, and the observation range was set with the magnification of 350 times and the number of pixels of 1280×960 pixels. As the observation range, a portion of the observation surface of each evaluation sample which was in an average state was selected. Next, the area ratio of the non-columnar crystal structure in the observation range was calculated by analysis.

Hereinafter, a specific analysis procedure will be described. First, the above observation range was divided into sections at regular intervals. A dimension of one section was 50 pixels.

Next, the luminance histogram was created for each section. Then, a peak position and σ of the luminance histogram were acquired for each section.

Next, it was determined whether each section was a non-columnar crystal structure. Specifically, a section in which the peak position of the luminance histogram was 130 or more and 200 or less and the σ was 20 or more and 40 or less was regarded as a non-columnar crystal structure. A section in which the peak position or the σ of the luminance histogram was outside the above range was not regarded as a non-columnar crystal structure. It was determined whether all the sections included in the observation range were the non-columnar crystal structures, and the number of sections that were the non-columnar crystal structures included in the observation range was divided by the number of all the sections to obtain the area ratio of the non-columnar crystal structure in the cross section of each evaluation sample.

Then, the area ratio of the non-columnar crystal structure in the cross section of each evaluation sample was averaged to calculate the area ratio of the non-columnar crystal structure in the cross section of the alloy for an R-T-B based permanent magnet for one manufacturing lot. Results are shown in Table 2.

(Manufacturing of R-T-B based Permanent Magnet)

After hydrogen was stored at room temperature for the alloy for an R-T-B based permanent magnet, the alloy for an R-T-B based permanent magnet was subjected to a hydrogen pulverization treatment (coarse pulverization) in which dehydrogenation was performed at 600° C. for 1 hour in vacuum to obtain an alloy powder (coarsely pulverized powder). In the present example, each step from the hydrogen pulverization treatment to sintering (fine pulverization and pressing) was performed in an Ar atmosphere with an oxygen concentration of less than 50 ppm or in the vacuum.

Next, zinc stearate and amide stearate as pulverization aids were added to the alloy powder, and was mixed using a Nauta mixer. An amount of zinc stearate added is 0.05 parts by mass with respect to 100 parts by mass of the coarsely pulverized powder. An amount of amide stearate added is 0.05 parts by mass with respect to 100 parts by mass of the coarsely pulverized powder. Then, the mixture was finely pulverized using a jet mill to obtain a finely pulverized powder having an average particle size of about 3.0 μm.

The obtained finely pulverized powder was filled in a mold arranged in electromagnets, and pressed in a magnetic field in which a pressure of 120 MPa was applied while applying a magnetic field of 1200 kA/m to obtain a green compact.

Thereafter, the obtained green compact was held in the vacuum at 1050° C. for 4 hours and sintered, and then quenched to obtain a sintered body having magnet compositions shown in Table 1. Then, the obtained sintered body was subjected to a two-step aging treatment at 900° C. for 1 hour and at 500° C. for 1 hour (both in the Ar atmosphere) to obtain the R-T-B based permanent magnet (R-T-B based sintered magnet).

[Magnetic Properties]

Br, HcJ, and Hk/HcJ of each sample were measured using a B-H tracer. Br was measured at the room temperature for all samples. In Examples 1 to 4 and Comparative Example 1, the HcJ and the Hk/HcJ were measured at the room temperature. In other Examples and Comparative Examples, the HcJ and the Hk/HcJ were measured at 150° C. Hk in the present example is a value of a magnetic field when magnetization is Br×0.9 in a second quadrant of a demagnetization curve.

TABLE 1

| Unit: mass % | T.RE | T.RL | Nd | Pr | Dy | Tb | B | Al | Co | Cu | Zr | Ga | Fe |
|---|---|---|---|---|---|---|---|---|---|---|---|---|---|
| Examples 1 to 4 and Comparative Example 1 | 31.5 | 31.5 | 25.3 | 6.2 | 0.0 | 0.0 | 0.90 | 0.3 | 0.9 | 0.2 | 0.5 | 0.6 | bal. |
| Examples 5 to 11 | 30.9 | 30.5 | 24.1 | 6.4 | 0.0 | 0.4 | 0.84 | 0.2 | 0.9 | 0.2 | 0.5 | 0.6 | bal. |
| Comparative Example 2 | 32.2 | 32.2 | 25.6 | 6.6 | 0.0 | 0.0 | 0.96 | 0.2 | 0.9 | 0.1 | 0.0 | 0.2 | bal. |

TABLE 2

| Example/ Comparative Example | Casting condition: Roll peripheral speed [m/s] | Casting condition: Supply speed of molten metal [kg/(min · cm)] | Area ratio of non-columnar crystal structure [%] | Magnetic properties of R-T-B based permanent magnet: Br [mT] | HcJ [kA/m] | Hk/HcJ [%] |
|---|---|---|---|---|---|---|
| Example 1 | 1.8 | 1.86 | 16.9 | 1373 | 1781 | 96 |
| Example 2 | 1.8 | 1.91 | 13.9 | 1374 | 1720 | 97 |
| Example 3 | 1.3 | 1.71 | 3.9 | 1372 | 1727 | 98 |
| Example 4 | 1.3 | 1.73 | 8.5 | 1378 | 1760 | 98 |
| Comparative Example 1 | 2.1 | 1.93 | 33.5 | 1363 | 1733 | 76 |
| Example 5 | 1.1 | 1.44 | 1.4 | 1400 | 575 | 97 |
| Example 6 | 1.5 | 1.96 | 24.9 | 1375 | 633 | 98 |
| Example 7 | 1.2 | 1.56 | 4.8 | 1396 | 593 | 98 |
| Example 8 | 1.2 | 1.64 | 7.1 | 1385 | 603 | 97 |
| Example 9 | 1.3 | 1.67 | 8.6 | 1385 | 606 | 98 |
| Example 10 | 1.3 | 1.75 | 13.5 | 1388 | 613 | 98 |
| Example 11 | 1.4 | 1.81 | 16.8 | 1379 | 615 | 97 |
| Comparative Example 2 | 1.6 | 1.73 | 0.1 | 1420 | 320 | 98 |

According to Examples 1 to 4 and Comparative Example 1, in the R-T-B based permanent magnet according to Examples 1 to 4 manufactured using the alloy for an R-T-B based permanent magnet in which the area ratio of the non-columnar crystal structure was 1.0% or more and 30.0% or less, the Br was higher, the HcJ was about the same, and the Hk/HcJ was higher than those in the R-T-B based permanent magnet according to Comparative Example 1 manufactured using the alloy for an R-T-B based permanent magnet manufactured under the same conditions except that the area ratio of the non-columnar crystal structure was out of the above range. In particular, the Hk/HcJ at room temperature was higher.

According to Examples 5 to 11, in the R-T-B based permanent magnet according to Examples 6 to 11 manufactured using the alloy for an R-T-B based permanent magnet in which the area ratio of the non-columnar crystal structure was 4.0% or more and 30.0% or less, the HcJ was higher than that of Example 5 manufactured under the same conditions except that the area ratio of the non-columnar crystal structure was 1.0% or more and less than 4.0%.

According to Examples 6 to 11, in the R-T-B based permanent magnet manufactured under the same conditions except that the area ratio of the non-columnar crystal structure in the alloy for an R-T-B based permanent magnet was changed from 4.0% to 30.0%, the higher the area ratio of the non-columnar crystal structure in the alloy for an R-T-B based permanent magnet, the higher the HcJ tended to be.

In Comparative Example 2, a content of B was 0.96 mass %, which was higher than that of the other Examples. Therefore, the area ratio of the non-columnar crystal structure decreased even under casting conditions similar to those of other Examples. As a result, the HcJ decreased as compared with Examples.

In all Examples, it was confirmed that an area ratio of a structure other than a chill crystal structure in the non-columnar crystal structure was 85% or more and 95% or less.

REFERENCE SIGNS LIST

1 chill crystal structure
3 fine dot-like R-rich phase-containing structure
4 dot-like R-rich phase-containing structure
5 fine linear R-rich phase-containing structure
6 large dot-like R-rich phase-containing structure
7 normal structure
11 main phase
13 R-rich phase
21 cooling roll
23 tundish
25 alloy molten metal
27 molten metal head pressure

What is claimed is:

1. An alloy for an R-T-B based permanent magnet, comprising:

R, T, and B, wherein

R is at least one of rare earth elements, T is at least one of transition metal elements, B is boron, and an area ratio of a non-columnar crystal structure in a cross section of the alloy is 1.0% or more and 30.0% or less, and the non-columnar crystal structure contains a chill crystal structure, and an area ratio of a structure other than the chill crystal structure in the non-columnar crystal structure is 85% or more and 95% or less.

2. The alloy for an R-T-B based permanent magnet according to claim 1, wherein the area ratio of the non-columnar crystal structure is 4.0% or more and 30.0% or less.

3. The alloy for an R-T-B based permanent magnet according to claim 1, wherein R content is 29.0 mass % or more and 33.5 mass % or less, and B content is 0.70 mass % or more and less than 0.96 mass %.

4. An alloy for an R-T-B based permanent magnet, comprising:

R, T, and B, wherein

R is at least one of rare earth elements, T is at least one of transition metal elements, B is boron, R content is 29.0 mass % or more and 33.5 mass % or less, and B content is 0.70 mass % or more and less than 0.96 mass %, and an area ratio of a non-columnar crystal structure in a cross section of the alloy is 7.1% or more and 30.0% or less, and the non-columnar crystal structure contains a chill crystal structure, and an area ratio of a structure other than the chill crystal structure in the non-columnar crystal structure is 50% or more.

5. A method for manufacturing an R-T-B based permanent magnet, comprising:

a step of pulverizing the alloy for an R-T-B based permanent magnet according to claim 1.

* * * * *